(12) United States Patent
Guo et al.

(10) Patent No.: US 12,015,260 B2
(45) Date of Patent: Jun. 18, 2024

(54) PROTECTION CIRCUIT AND SERVER SYSTEM

(71) Applicant: Shenzhen Fulian Fugui Precision Industry Co., Ltd., Shenzhen (CN)

(72) Inventors: Li-Wen Guo, Shenzhen (CN); Lin Zhang, Shenzhen (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 400 days.

(21) Appl. No.: 17/555,679

(22) Filed: Dec. 20, 2021

(65) Prior Publication Data
US 2023/0163585 A1    May 25, 2023

(30) Foreign Application Priority Data

Nov. 24, 2021   (CN) .......................... 202111403005.5

(51) Int. Cl.
*H02H 7/00*   (2006.01)
*H02H 1/00*   (2006.01)
*H02H 7/20*   (2006.01)
*H04Q 1/24*   (2006.01)

(52) U.S. Cl.
CPC ............ *H02H 1/0007* (2013.01); *H02H 7/20* (2013.01); *H04Q 1/24* (2013.01)

(58) Field of Classification Search
None
See application file for complete search history.

(56) References Cited

U.S. PATENT DOCUMENTS

| 5,637,991 | A | * | 6/1997 | Brown ..................... G06F 1/26 |
| | | | | 323/269 |
| 10,819,143 | B1 | * | 10/2020 | Hsiang .................. H02H 3/385 |
| 2015/0026486 | A1 | * | 1/2015 | Liu ........................... G06F 1/26 |
| | | | | 713/300 |
| 2020/0333873 | A1 | * | 10/2020 | El Sherif ............. G06F 1/3296 |

FOREIGN PATENT DOCUMENTS

| CN | 112531632 A | 3/2021 |
| CN | 112599107 A | 4/2021 |
| TW | M261908 U | 4/2005 |

* cited by examiner

*Primary Examiner* — Stephen W Jackson
(74) *Attorney, Agent, or Firm* — ScienBiziP, P.C.

(57) ABSTRACT

A protection circuit against connection of an incorrect power supply, applied in a server system, includes a mainboard circuit, the protecting circuit includes at least two power sources, a comparing module, and a protecting module. The comparing module determines whether the multiple power sources are the same in current and voltage. When the power sources are determined to be the same, the comparing module outputs a first signal, the protecting module connects the at least two power sources to the mainboard circuit accordingly. If the at least two power sources are determined as not being the same, the comparing module outputs a second signal, the protecting module disconnects the multiple power sources and the mainboard circuit accordingly.

14 Claims, 2 Drawing Sheets

150
PROTECTION CIRCUIT AND SERVER SYSTEM

CROSS-REFERENCE TO RELATED APPLICATIONS

This application claims priority to Chinese Patent Application No. 202111403005.5 filed on Nov. 24, 2021, filed in China National Intellectual Property Administration, the contents of which are incorporated by reference herein.

FIELD

The subject matter herein generally relates to server technology, and particularly to a protection circuit and a server system having the protection circuit.

BACKGROUND

If operators mistakenly connect a power source of a circuit board of a server when they are installing the server, such as connecting a power connector to different power sources, or misconnecting different power sources, accidents may happen to the circuit board or even to the server system. In order to avoid the aforesaid accidents and protect the server system, improvements in monitoring electrical current from the wrong power source may be needed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
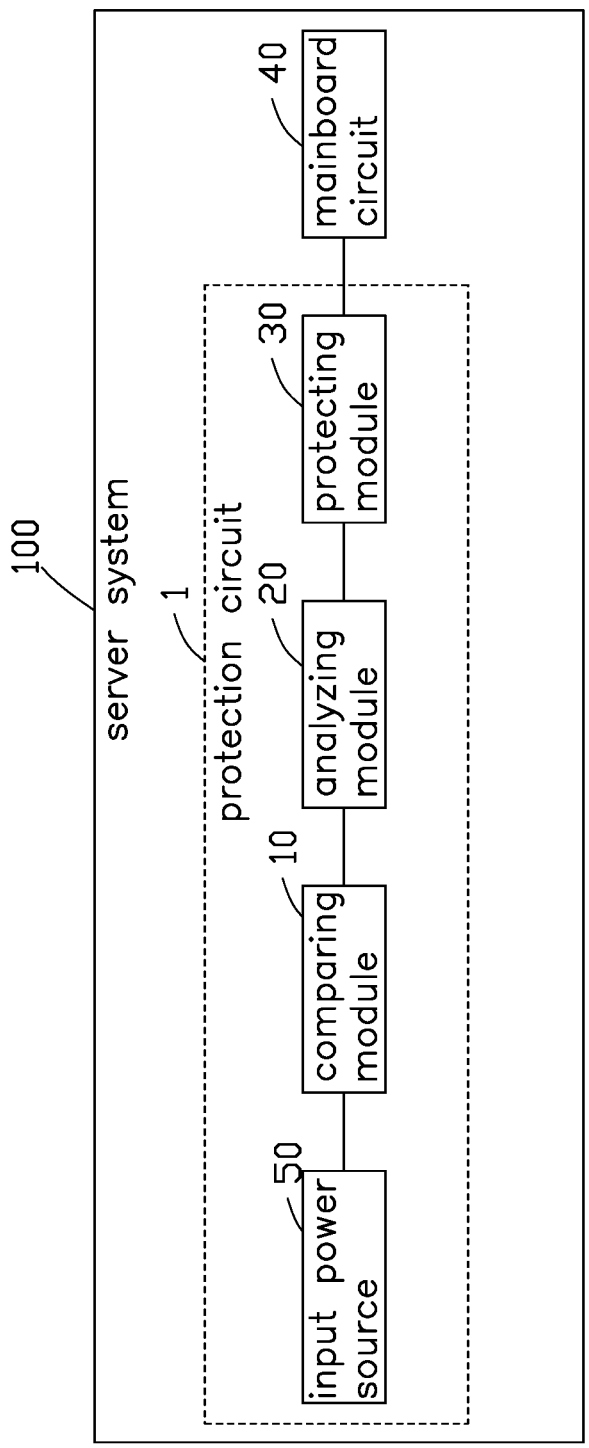
FIG. 1 illustrates a schematic view of at least one embodiment of a protection circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Figure 2:
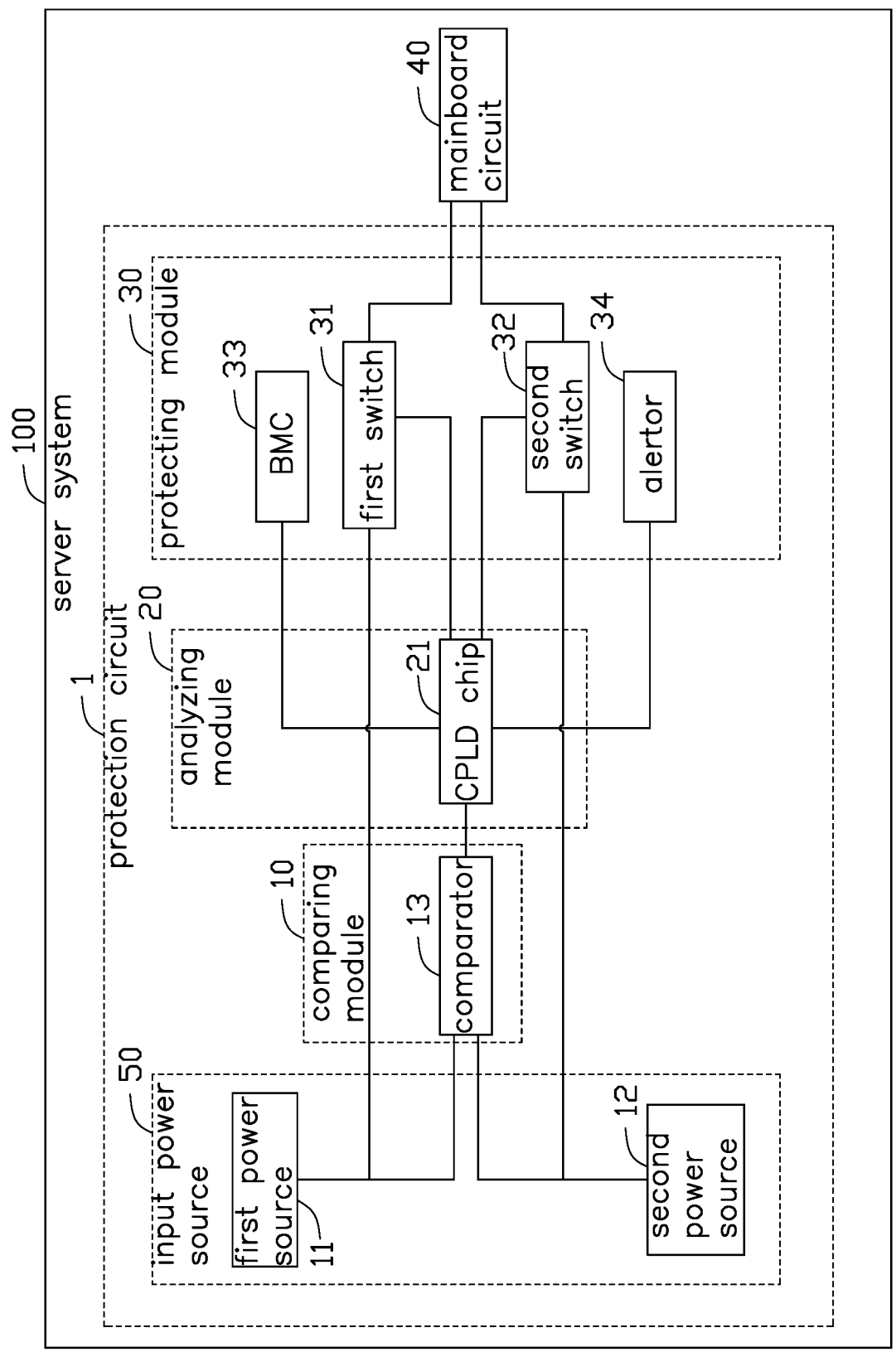
FIG. 2 is a circuit diagram of at least one embodiment of the protection circuit.

FIGS. 1 and 2 illustrate at least one embodiment of a protection circuit 1 applied in a server system 100. The protection circuit 1 compares the power sources in a plurality of power sources connected to the server system 100, analyzes a compared result, and applies a circuit protection according to an analyzed result, so as to protect the server system 100.

Referring to FIG. 1, the server system 100 includes a protection circuit 1 and a mainboard circuit 40 electrically connected to the protection circuit 1. The mainboard circuit 40 is electrically connected to a power source through the protection circuit 1 and configured to provide power for the server system 100. The protection circuit 1 is configured to ensure that the mainboard circuit 40 is connected to the correct power source. In at least one embodiment, the mainboard circuit 40 may include necessary electronic components, functional modules, and/or integrated circuits for performing functions of the server system 100.

The protection circuit 1 may include a comparing module 10, an analyzing module 20, a protecting module 30, and an input power source 50. The input power source 50, the comparing module 10, the analyzing module 20, and the protecting module 30 are electrically connected in that order.

The comparing module 10 compares power sources of the input power source 50. As shown in FIG. 2, the input power source 50 includes at least two power sources for providing power supply (such as currents and voltages) for the server system 100. In at least one embodiment, the at least two power sources include a first power source 11 and a second power source 12. The first power source 11 may output a first current and a first voltage. The second power source 12 may output a second current and a second voltage. The comparing module 10 includes a comparator 13. The comparator 13 is electrically connected to the first power source 11 and the second power source 12.

The comparator 13 receives the first current, the first voltage, the second current and the second voltage, determines whether the first current is equal to the second current, and whether the first voltage is equal to the second voltage, so as to determine whether the first power source 11 and the second power source 12 are a same power source. In at least one embodiment, when the output currents of the first power source 11 and the second power source 12 are equal, that is the first current is equal to the second current, and the first voltage is equal to the second voltage, the first power source 11 and the second power source 12 are determined as being the same power source.

When the first power source 11 and the second power source 12 are the same power source, the comparator 13 outputs a first signal to the analyzing module 20. If the first power source 11 and the second power source 12 are not the same, the comparator 13 outputs a second signal to the analyzing module 20, the second signal is opposite to the first signal.

In at least one embodiment, the comparator 13 may be a non-inverting operational comparator. When the first power source 11 and the second power source 12 are the same, the comparator 13 outputs a value of 0. When the first power source 11 and the second power source 12 are not the same, the comparator 13 outputs a value of 1.

The analyzing module 20 is configured to analyze a compared result of the comparing module 10. The analyzing module 20 may include a Complex Programmable logic device (CPLD) chip 21. The CPLD chip 21 is electrically connected to the comparator 13 and configured to receive the compared result of the comparator 13. For instance, when the CPLD chip 21 receives the first signal, the CPLD chip 21 outputs a third signal to the protecting module 30. When the CPLD chip 21 receives the second signal, the CPLD chip 21 outputs a fourth signal, a fifth signal, and a sixth signal to the protecting module 30. In at least one embodiment, the third signal and the fourth signal may be enable signals, the fifth signal may be an Inter-Integrated Circuit (I2C) signal, the sixth signal may be a non-enable and alarm signal.

The protecting module 30 is configured to apply circuit protecting process according to received signals. Referring to FIG. 2, the protecting module 30 includes a first switch 31, a second switch 32, a Baseboard Management Controller (BMC) 33, and an alertor 34.

The first switch 31 and the second switch 32 are electrically connected to the CPLD chip 21, and configured to switch according to the signals outputted by the CPLD chip 21. The first switch 31 is further electrically connected to the first power source 11 and the mainboard circuit 40. When the first switch 31 receives the third signal outputted by the CPLD chip 21, the first switch 31 switches on to connect the first power source 11 and the mainboard circuit 40. When the first switch 31 receives the fourth signal outputted by the CPLD chip 21, the first switch 31 switches to disconnect the first power source 11 and the mainboard circuit 40.

The second switch 32 is further electrically connected to the second power source 12 and the mainboard circuit 40. When the second switch 32 receives the third signal outputted by the CPLD chip 21, the second switch 32 switches on to connect the second power source 12 and the mainboard circuit 40. When the second switch 32 receives the fourth signal outputted by the CPLD chip 21, the second switch 32 switches to disconnect the second power source 12 and the mainboard circuit 40.

The BMC 33 and the alertor 34 are electrically connected to the CPLD chip 21. The BMC 33 receives the fifth signal outputted by the CPLD chip 21. The alertor 34 receives the sixth signal outputted by the CPLD chip 21.

In at least one embodiment, when the BMC 33 receives the fifth signal outputted by the CPLD chip 21, the BMC 33 may rapidly output alarm information to a BMC website, operators may take notice of the alarm information through the BMC website and resolve any problems.

The alertor 34 may include an alarm indicator light. When the alertor 34 receives the sixth signal outputted by the CPLD chip 21, the alarm indicator light may rapidly switch on to warn the operators as to the power source being misconnected, so the operators may resolve any problems. In other embodiments, the alertor 34 may include a speaker or a notice trigger. When the alertor 34 receives the sixth signal outputted by the CPLD chip 21, the speaker or the notice trigger may rapidly output a notice audio for the operators to take notice that the power source is misconnected, so the operators may resolve any problems.

In at least one embodiment, when the server system 100 is powered on, the protection circuit 1 immediately outputs signals as to the power source. When detecting that the power source is misconnected, the protection circuit 1 applies circuit protecting process very rapidly.

The protection circuit 1 identify whether the power source is misconnected, first to compare the connected power sources, then analyze the compared result, last to apply circuit protecting process according to the analyzed result. The whole process is very quick, to provide more reaction time for the operators.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A protection circuit applicable in a server system, the server system comprising a mainboard circuit, the protecting circuit comprising:
   at least two power sources;
   a comparing module configured to determine whether the at least two power sources are the same; and
   a protecting module, the protecting module and the comparing module being electrically connected between the at least two power sources and the mainboard circuit,
   wherein when the at least two power sources are the same is determined, the comparing module outputs a first signal, the protecting module connects the at least two power sources to the mainboard circuit according to the first signal; and
   when the at least two power sources are not the same is determined, the comparing module outputs a second signal, the protecting module disconnects the at least two power sources from the mainboard circuit according to the second signal;
   the at least two power sources are configured to provide power for the server system and comprise a first power source and a second power source, the first power source outputs a first current and a first voltage, the second power source outputs a second current and a second voltage;
   the comparing module comprises a comparator electrically connected to the first power source and the second power source, the comparator receives the first current, the first voltage, the second current, and the second voltage, the comparator compares whether the first current is equal to the second current, and compares whether the first voltage is equal to the second voltage, so as to determine whether the first power source and the second power source are the same.

2. The protection circuit according to claim 1, further comprising an analyzing module, wherein the analyzing module is configured to analyze a compared result of the comparing module, wherein
   when the first power source and the second power source are the same is determined, the comparator outputs a first signal to the analyzing module, the analyzing module outputs a third signal according to the first signal; and
   when the first power source and the second power source are not the same is determined, the comparator outputs a second signal to the analyzing module, the analyzing module outputs a fourth signal according to the second signal.

3. The protection circuit according to claim 2, wherein the analyzing module comprises a CPLD chip electrically connected to the comparator and configured to analyze the compared result, wherein
when the CPLD chip receives the first signal, the CPLD chip outputs the third signal to the protecting module; and
when the CPLD chip receives the second signal, the CPLD chip outputs the fourth signal to the protecting module.

4. The protection circuit according to claim 3, wherein the protecting module is configured to apply a protecting process according to the received signal; the protecting module comprises a first switch and a second switch; the first switch and the second switch are electrically connected to the CPLD chip and configured to apply the protecting process according to the signals outputted by the CPLD chip.

5. The protection circuit according to claim 4, wherein the first switch is further electrically connected to the first power source and the mainboard circuit, when the first switch receives the third signal outputted by the CPLD chip, the first switch switches on to connect the first power source and the mainboard circuit; when the first switch receives the fourth signal outputted by the CPLD chip, the first switch switches to disconnect the first power source and the mainboard circuit;
the second switch is further electrically connected to the second power source and the mainboard circuit, when the second switch receives the third signal outputted by the CPLD chip, the second switch switches on to connect the second power source and the mainboard circuit; when the second switch receives the fourth signal outputted by the CPLD chip, the second switch switches to disconnect the second power source and the mainboard circuit.

6. The protection circuit according to claim 3, wherein when the CPLD chip receives the second signal, the CPLD chip further outputs a fifth signal and a sixth signal to the protecting module, the fifth signal is an Inter-Integrated Circuit signal, the sixth signal is an alarm signal.

7. The protection circuit according to claim 6, wherein the protecting module further comprises a Baseboard Management Controller (BMC) and an alertor electrically connected to the CPLD chip, the BMC receives the fifth signal outputted by the CPLD chip and outputs alarm information to a BMC website; the alertor comprises an alarm indicator light, the alertor receives the sixth signal outputted by the CPLD chip, the alarm indicator light switches on.

8. A server system comprising:
a mainboard circuit; and
a protection circuit comprising:
at least two power sources;
a comparing module configured to determine whether the at least two power sources are the same; and
a protecting module, the protecting module and the comparing module being electrically connected between the at least two power sources and the mainboard circuit,
wherein when the at least two power sources are the same is determined, the comparing module outputs a first signal, the protecting module connects the at least two power sources to the mainboard circuit according to the first signal; and
when the at least two power sources are not the same is determined, the comparing module outputs a second signal, the protecting module disconnects the at least two power sources and the mainboard circuit according to the second signal;
the at least two power sources are configured to provide power for the server system and comprise a first power source and a second power source, the first power source outputs a first current and a first voltage, the second power source outputs a second current and a second voltage;
the comparing module comprises a comparator electrically connected to the first power source and the second power source, the comparator receives the first current, the first voltage, the second current, and the second voltage, the comparator compares whether the first current is equal to the second current, and compares whether the first voltage is equal to the second voltage, so as to determine whether the first power source and the second power source are the same.

9. The server system according to claim 8, further comprising an analyzing module, wherein the analyzing module is configured to analyze a compared result of the comparing module, wherein
when the first power source and the second power source are the same is determined, the comparator outputs a first signal to the analyzing module, the analyzing module outputs a third signal according to the first signal; and
when the first power source and the second power source are not the same is determined, the comparator outputs a second signal to the analyzing module, the analyzing module outputs a fourth signal according to the second signal.

10. The server system according to claim 9, wherein the analyzing module comprises a CPLD chip electrically connected to the comparator and configured to analyze the compared result;
when the CPLD chip receives the first signal, the CPLD chip outputs the third signal to the protecting module;
when the CPLD chip receives the second signal, the CPLD chip outputs the fourth signal to the protecting module.

11. The server system according to claim 10, wherein the protecting module is configured to apply a protecting process according to the received signal; the protecting module comprises a first switch and a second switch; the first switch and the second switch are electrically connected to the CPLD chip and configured to apply the protecting process according to the signals outputted by the CPLD chip.

12. The server system according to claim 11, wherein the first switch is further electrically connected to the first power source and the mainboard circuit, when the first switch receives the third signal outputted by the CPLD chip, the first switch switches on to connect the first power source and the mainboard circuit; when the first switch receives the fourth signal outputted by the CPLD chip, the first switch switches to disconnect the first power source and the mainboard circuit;
the second switch is further electrically connected to the second power source and the mainboard circuit, when the second switch receives the third signal outputted by the CPLD chip, the second switch switches on to connect the second power source and the mainboard circuit; when the second switch receives the fourth signal outputted by the CPLD chip, the second switch switches to disconnect the second power source and the mainboard circuit.

13. The server system according to claim 10, wherein when the CPLD chip receives the second signal, the CPLD chip further outputs a fifth signal and a sixth signal to the protecting module, the fifth signal is an Inter-Integrated Circuit signal, the sixth signal is an alarm signal.

14. The server system according to claim 13, wherein the protecting module further comprises a Baseboard Management Controller (BMC) and an alertor electrically connected to the CPLD chip, the BMC receives the fifth signal outputted by the CPLD chip and outputs alarm information to a BMC website; the alertor comprises an alarm indicator light, the alertor receives the sixth signal outputted by the CPLD chip, the alarm indicator light switches on.

* * * * *